United States Patent [19]

Wallace

[11] Patent Number: 4,812,856

[45] Date of Patent: Mar. 14, 1989

[54] METHOD AND APPARATUS FOR DISPENSING A FLUID WITH DISPERSED PARTICLES THEREIN

[75] Inventor: David B. Wallace, Dallas, Tex.

[73] Assignee: MicroFab Technologies, Inc., Plano, Tex.

[21] Appl. No.: 114,609

[22] Filed: Oct. 30, 1987

[51] Int. Cl.[4] ........................ G01D 15/16; B05C 11/00; B05D 3/12; B05D 3/00

[52] U.S. Cl. ........................................ 346/1.1; 346/75; 346/140 R; 427/57; 427/444; 118/610; 118/612

[58] Field of Search ........................... 346/140, 1.1, 75; 427/57, 444; 118/610, 612

[56] References Cited

U.S. PATENT DOCUMENTS 4,460,904 7/1984 Oszczakiewics ............... 346/140 IJ 4,682,187 7/1987 Martner ....................... 346/140 PD

*Primary Examiner*—E. A. Goldberg

*Assistant Examiner*—Mark Reinhart

*Attorney, Agent, or Firm*—Kanz, Scherback & Timmons

[57] ABSTRACT

Methods and apparatus for dispensing a fluid with dispersed particles therein are disclosed which include a reservoir containing the fluid and dispersed particles. The fluid is agitated to maintain dispersion of the particles. The output of the reservoir is provided through a filter to a three-way valve and pressurized as required. The common port of the three-way valve is connected to a print module controlled by a programmable controller. Bypass flow is provided to increase the flow rate through the system. The system may be operated in either the demand mode or the continuous mode.

14 Claims, 1 Drawing Sheet

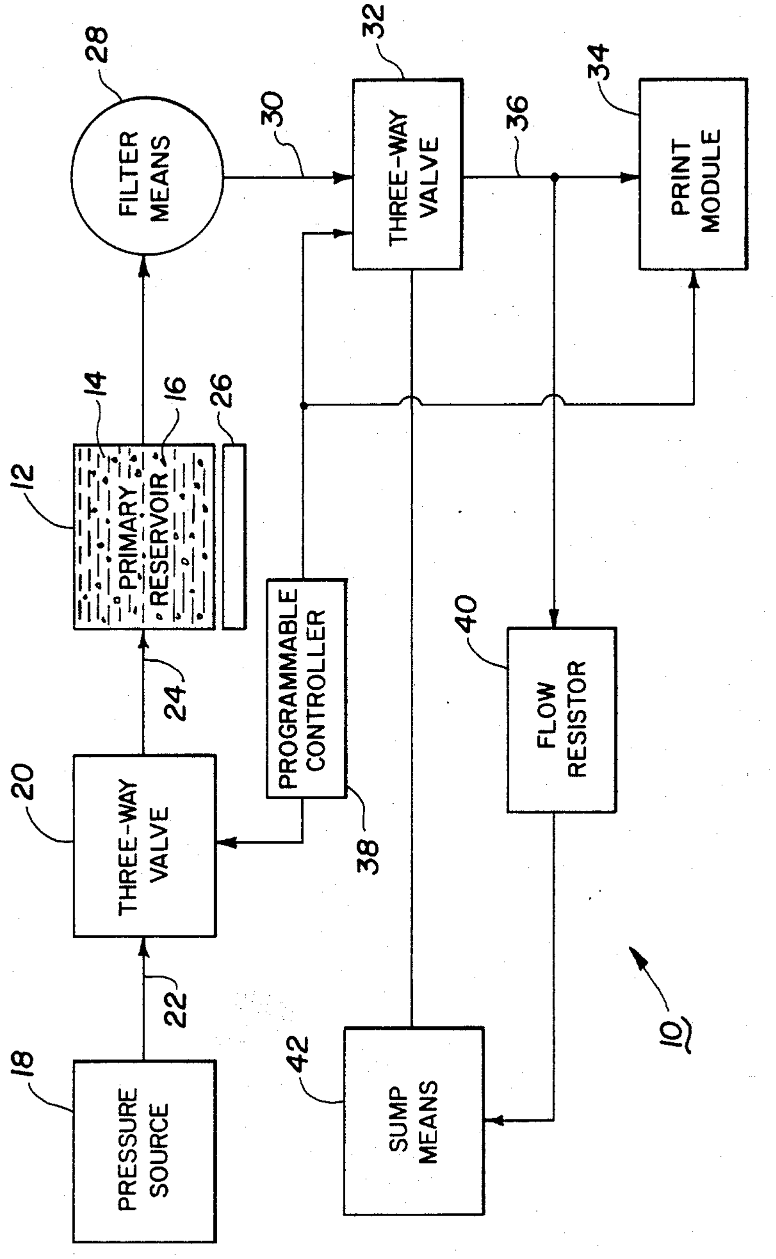
PRESSURE SOURCE
18
22
THREE-WAY VALVE
20
24
PRIMARY RESERVOIR
12
14
16
26
FILTER MEANS
28
30
THREE-WAY VALVE
32
36
PRINT MODULE
34
PROGRAMMABLE CONTROLLER
38
FLOW RESISTOR
40
SUMP MEANS
42
10

METHOD AND APPARATUS FOR DISPENSING A FLUID WITH DISPERSED PARTICLES THEREIN

BACKGROUND OF THE INVENTION

This invention relates to dispensing fluids containing dispersed or suspended particles. More particularly, it relates to methods and apparatus for dispensing a very small and precise amount of particles dispersed in a fluid in such areas as ceramics, metallics and latex spheres.

The drive toward miniaturization in the electronics industry has resulted in a need for greater precision in placement accuracy and volumetric control for dispensing adhesives and coatings. Conventional dispensing techniques use either positive displacement pumps or timed valving of fluid under pressure, but the precision of these methods is limited by the tendency of the fluids to adhere to the dispense tips and the fluid inside.

In the electronics area, a number of applications also require the dispensing of slurries of metal or ceramic particles. One of the key applications is for superconductive material printing. Another application is for latex particle-laden flows where uniform particle diameters are deposited so one may measure them later in the system or light may be scattered from them to measure velocities. In the medical field, the coating of latex particles is desired.

The conventional technology for many of the applications which the present invention replaces is that of silk screening. Silk screening has some very constraining requirements which include the requirement that the fluid must be very viscous. The time required to turn around a new screen and bring the process up and running is too long. It is generally for high volume applications.

SUMMARY OF THE INVENTION

The present invention provides a method and apparatus for use with ink jet type dispensing of fluids with dispersed particles such as conductors, resistors, adhesives, coatings of magnetic and ceramic materials, magnetic inks, etc., therein. The apparatus comprises a reservoir to hold the fluid and dispersed particles and means to agitate the fluid to maintain the dispersed particles in suspension. The output of the reservoir is connected to a three-way valve through a filter. The common port of the three-way valve is connected to a print module controlled by a programmable controller. Means are provided to pressurize the system at desired times. The filter assures that only particles smaller than a predetermined size will flow to the print module. Bypass means are provided at the common port of the three-way valve to increase the flow rate through the system. The system may be operated in either the demand mode or the continuous mode.

Among the advantages of the present invention is the capability to lay down or print with superconductive materials in a predetermined manner. The present invention provides the capability to dispense particles in a very small and precise amount in a predetermined pattern or to coat an element with a very uniform coating of material. The present invention also allows the laying down of uniform particle diameters. The present invention allows control by computer aided design type software.

Examples of the more important features and advantages of this invention have thus been summarized rather broadly in order that the following detailed description may be better understood and in order that the contribution to the art may be better appreciated. There are, of course, additional features of the invention which will be described hereinafter and which will also form the subject of the claims appended hereto. Other features of the present invention will become apparent with reference to the following detailed description of a presently preferred embodiment thereof in connection with the accompanying drawing in which the sole FIGURE is a simplified block diagram schematic of the present invention.

BRIEF DESCRIPTION OF THE DRAWING

The FIGURE is a schematic of the invention.

DESCRIPTION OF THE PREFERRED EMBODIMENT

Referring now the the drawing, apparatus for dispensing a fluid according to the present invention is generally referred to by reference numeral 10. The apparatus includes a primary reservoir 12 for holding a fluid 14 which has particles 16 dispersed therein. The particles 16 could be metallic, ceramic, magnetic, etc. The primary reservoir 12 is structured such that it may be pressurized by pressure source 18. In the preferred embodiment, pressure source 18 comprises a source of air pressure which is operatively connected to primary reservoir 12 through a three-way valve 20. The normally closed port of three-way valve 20 is connected to pressure source 18 by conduit 22. The common port is connected to primary reservoir 12 by conduit 24 and the normally open port is vented to the atmosphere. Operatively associated with primary reservoir 12 is agitation means 26 for agitating the fluid 14 and particles 16. In the preferred embodiment, agitation means 26 comprises magnetic stirring means or ultrasonic stirring means.

The output of primary reservoir 12 is operatively connected to filter means 28 by conduit 30. In the preferred embodiment, filter means 28 comprises a mesh filter with openings therein of 10 to 40 microns depending upon the size of the particles 16 being used. The output of filter means 28 is operatively connected to the normally closed port of three-way valve 32. For purposes of this disclosure, three-way valve 32 will be known as the first three-way valve and three-way valve 20 will be known as the second three-way valve. In the preferred embodiment, three-way valves 20 and 32 comprise high speed/low volume, three-way, normally closed valves.

The common port of three-way valve 32 is operatively connected to print module 34 by conduit 36. In the preferred embodiment, print module 34 is an ink jet type of print module and receives control information from programmable controller 38. Programmable controller 38 also provides control information to three-way valves 20 and 32. In the preferred embodiment, print module 34 has an orifice with a diameter between 25 and 200 microns, the exact size being dependent upon the particular fluid 14 and the particular size of the particles 16 being dispensed at that particular time. The common port of three-way valve 32 is also operatively connected to flow resistor means 40, the output of which is operatively connected to sump means 42. Sump means 42 is vented to atmospheric pressure. The normally open port of three-way valve 32 is also operatively connected to sump means 42.

In operation, apparatus 10 has the desired amount of fluid 14 with predetermined particles 16 in the primary reservoir 12 is agitated in order to keep the particles 16 in suspension. The system is loaded by first providing air pressure to the primary reservoir 12 from pressure source 18. Three-way valve 20 will be activated which connects the common port with the normally closed port which is now open. The pressure will be between 4 and 40 psi depending upon the particular fluid 14 being used. This loads or pressurizes the system up to the normally closed port of the three-way valve 32. The purpose of the filter means 28 is to assure that the particles 16 which pass to the print module 34 will not be of a size which is large enough to clog the orifice of the print module 34. The three-way valve 32 is then cycled back and forth from activation to deactivation at a predetermined rate to load the remainder of the system. Three-way valve 32 is a very fast acting, low volume valve and thus creates very large hydraulic transients or water hammer effects. The water hammer effect assures that the particles 16 are suspended throughout the system and that the filter is prevented from loading or being blocked. The water hammer effect has a back pressure effect on the filter means and breaks up the particles 16 if they become concentrated on a portion of the screen. The conduits are kept small in diameter to keep the velocity of the fluid 14 high and to keep the particles 16 in suspension. Bypass of the fluid 14 and particles 16 through flow resistor means 40 increases the flow rate through the system which both increases the water hammer effect and the velocity through the conduits and elements of the system. In the preferred embodiment the amount of bypass flow of the fluid 14 and particles 16 is from zero to twenty times the amount of flow through the print module 34.

After the system has been loaded by pressurization the system may be operated in either one of two modes. In one mode (the demand mode) a drop of fluid 14 with particles 16 is dispensed each time the print module 34 is pulsed or activated. In the other mode (the continuous mode) drops of fluid 14 with particles 16 are continuously being dispensed by the print module 34. It will be appreciated that different types of print modules would be required for the two different modes of system operation.

In the demand mode, after the system has been loaded by pressurization, the pressure is removed from the primary reservoir 12 by deactivating three-way valve 20 which then vents the primary reservoir 12 to the atmosphere. The print module 34 is then pulsed or activated by a high voltage pulse train from the programmable controller 38, thus results in a drop of fluid 14 and particles 16 being dispensed for each pulse of the high voltage pulse train. In addition, the high voltage pulse train creates hydraulic transients in the print module 34 and further mixes the fluid 14 and particles 16 in the print module 34. If settling of the particles 16 in the system does occur, the system may be pressurized and loaded again to assure mixing of the fluid 14 and particles 16. The demand mode of dispensing the fluid 14 and particles 16 may then be continued.

In the continuous mode, after the system has been loaded by pressurization, the system remains pressurized and loaded and control of the amount of fluid 14 and particles 16 being dispensed is controlled by cycling the three-way valve 32. Much higher volumes of fluid 14 and particles 16 are dispensed in the continuous mode. The print module 34 is still pulsed from the programmable controller 38 to provide a final mixing action of the fluid 14 and the particles 16. If the system is used to only dispense the fluid 14 and particles 16 in a line pattern, then it is would be necessary to use a charge and deflect type of print module.

Although the present invention has been described with reference to specific forms thereof, it is evident that many alternatives, modifications and variations will become apparent to those skilled in the art in light of the foregoing disclosure. Accordingly, this description is to be construed as illustrative only and is for the purpose of teaching those skilled in the art the manner of carrying out the invention. It is to be understood that the forms of the invention shown and described are to be taken as presently preferred embodiments. Various changes may be made in the shape, size and arrangement of parts. For example, equivalent elements may be substituted for those illustrated and described, parts may be reversed and certain features of the invention may be utilized independently of other features of the invention. It will therefore be appreciated that various modifications, alternatives, variations, etc., may be made without departing from the spirit and scope of the invention as defined in the appended claims.

What is claimed:

1. Apparatus for dispensing a fluid with dispersed particles therein, said apparatus comprising;

(a) a primary reservoir structured to hold said fluid with dispersed particles therein, said primary reservoir including outlet means to provide an output of said fluid with dispersed particles therein;

(b) means for agitating said fluid in said primary reservoir to maintain said dispersed particles in suspension in said fluid;

(c) means to pressurize said primary reservoir;

(d) filter means operatively connected to receive the output of said primary reservoir, said filter means including outlet means to provide an output of said fluid with dispersed particles therein;

(e) a first three-way valve means comprising a common port, a normally open port and a normally closed port, said normally closed port operatively connected to receive the output of said filter means;

(f) a print module operatively connected to the common port of said three-way valve;

(g) flow resistor means operatively connected to said common port of said three-way valve, said flow resistor means including outlet means to provide an output of said fluid with dispersed particles therein; and (h) sump means operatively connected to receive the output of said flow resistor means, said sump means also operatively connected to the normally open port of said three-way valve means.

2. The apparatus of claim 1 further including a second three-way valve means operatively connected between said primary reservoir and said means to pressurize said primary reservoir.

3. The apparatus of claim 1 wherein said primary reservoir is pressurized with a pressure between 4 psi to 40 psi.

4. The apparatus of claim 1 wherein said means for agitating comprises a magnetic stirring means.

5. The apparatus of claim 1 wherein said means for agitating comprises ultrasonic stirring means.

6. The apparatus of claim 1 wherein said filter means comprises a mesh filter with openings between 10 to 40 microns.

7. The apparatus of claim 1 wherein said sump means is vented to atmospheric pressure.

8. The apparatus of claim 1 further including means to control the operation of the first three-way valve means in a predetermined manner.

9. The apparatus of claim 8 wherein said means to control the operation of the first three-way valve means comprises a programmable controller.

10. The apparatus of claim 1 wherein said print module comprises an ink-jet type dispensing mechanism.

11. The apparatus of claim 1 further including means to control the operation of said print module.

12. The apparatus of claim 11 wherein said means to control the operation of said print module comprises a programmable controller.

13. A method of dispensing a fluid with dispersed particles therein comprising the steps of:

(a) providing a primary reservoir containing a predetermined amount of fluid with dispersed particles therein;

(b) agitating said fluid to maintain said dispersed particles suspended in said fluid;

(c) pressurizing said primary reservoir;

(d) providing an output of said pressurized fluid with dispersed particles therein to a mesh filter with openings therein of a predetermined size;

(e) providing an output of said pressurized fluid with dispersed particles therein from said mesh filter to a three-way valve;

(f) providing an output path from the common port of said three-way valve to a print module;

(g) providing an output path from the common port of said three-way valve to a sump which is vented to atmospheric pressure;

(h) providing an output path from the normally open port of said three-way valve to said sump;

(i) cycling said three-way valve at a predetermined rate;

(j) removing the pressure from said primary reservoir;

(k) pulsing said print module with a high voltage pulse train which creates a drop of said fluid with dispersed particles therein for each pulse of the high voltage pulse train.

14. A method of dispensing a fluid with dispersed particles therein comprising the steps of:

(a) providing a primary reservoir containing a predetermined amount of fluid with dispersed particles therein;

(b) agitating said fluid to maintain said dispersed particles suspended in said fluid;

(c) pressurizing said primary reservoir;

(d) providing an output of said pressurized fluid with dispersed particles therein to a mesh filter with openings therein of a predetermined size;

(e) providing an output of said pressurized fluid with dispersed particles therein from said mesh filter to a three-way valve;

(f) providing an output path from the common port of said three-way valve to a print module;

(g) providing an output path from the common port of said three-way valve to a sump which is vented to atmospheric pressure;

(h) providing an output path from the normally open port of said three-way valve to said sump;

(i) cycling said three-way valve at a predetermined rate;

(j) pulsing said print module with a high voltage pulse train to provide a final mixing of the fluid and the particles suspended therein.

* * * * *